United States Patent
Li et al.

(10) Patent No.: US 8,691,920 B2
(45) Date of Patent: Apr. 8, 2014

(54) THERMOSETTABLE COMPOSITION CONTAINING A HALF ESTER OF A CYCLOALIPHATIC DIOL AND A THERMOSET PRODUCT THEREFROM

(75) Inventors: Yong-Jiang Li, Shanghai (CN); Ludovic Valette, Lake Jackson, TX (US)

(73) Assignee: DOW Global Technologies, Midland, MI (US)

( * ) Notice: Subject to any disclaimer, the term of this patent is extended or adjusted under 35 U.S.C. 154(b) by 55 days.

(21) Appl. No.: 13/265,375

(22) PCT Filed: Apr. 21, 2009

(86) PCT No.: PCT/CN2009/000422
§ 371 (c)(1),
(2), (4) Date: Oct. 20, 2011

(87) PCT Pub. No.: WO2010/121392
PCT Pub. Date: Oct. 28, 2010

(65) Prior Publication Data
US 2012/0053302 A1    Mar. 1, 2012

(51) Int. Cl.
*C08G 59/62* (2006.01)
*C09K 3/00* (2006.01)
*C08L 63/08* (2006.01)
*C08L 63/02* (2006.01)

(52) U.S. Cl.
USPC ............... 525/408; 252/182.23; 252/182.27; 252/182.14

(58) Field of Classification Search
USPC ........... 525/408; 252/182.23, 182.27, 182.14
See application file for complete search history.

(56) References Cited

U.S. PATENT DOCUMENTS

| | | | |
|---|---|---|---|
| 3,031,434 A * | 4/1962 | Radlove | 528/361 |
| 4,313,859 A | 2/1982 | Gardner | |
| 4,321,351 A * | 3/1982 | Zuppinger et al. | 528/91 |
| 4,497,945 A | 2/1985 | Salloum et al. | |
| 5,043,220 A | 8/1991 | Shalati et al. | |
| 5,480,960 A | 1/1996 | Freriks et al. | |
| 5,587,433 A | 12/1996 | Boeckeler | |
| 6,111,015 A | 8/2000 | Eldin et al. | |
| 6,403,667 B1 | 6/2002 | Eleveld et al. | |
| 6,884,854 B2 | 4/2005 | Schoenfeld et al. | |

FOREIGN PATENT DOCUMENTS

| | | |
|---|---|---|
| CN | 1354764 | 6/2002 |
| CN | 1422316 | 6/2003 |
| WO | 97/31965 | 9/1997 |

OTHER PUBLICATIONS

Iijima et al (Preparation of poly(1,4-cyclohexylene-dimethylene phthalate)s and their use as a modifiers for aromatic dimaine-cured epoxy. Polym. Int. vol. 49 871-880 Aug. 2000).*
Iijima et al (Toughening of Epoxy Resins by Modification with Aromatic Poylesters. J Applied Polymer Science 43 463-474 Aug. 1991).*
Argyopoulos, J. et al (UNOXOL(TM) Diol: A New Liquid Cycloaliphatic diol for Coating Applications, Paint and Coating Industry, p. 1-5, Jun. 2006).*
Supplemental European Search Report from related EP Application EP09843497.0 which is related to PCT Application PCT/CN2009000422, dated Jan. 3, 2013, 5 pages.
International Search Report from related PCT application PCT/CN2009/000422 dated Jan. 28, 2010, 5 pages.

* cited by examiner

*Primary Examiner* — Randy Gulakowski
*Assistant Examiner* — Christopher M Rodd
(74) *Attorney, Agent, or Firm* — Brooks, Cameron & Huebsch, PLLC

(57) ABSTRACT

A half ester of an organic polyol made by reacting polyols with anhydrides; a thermosettable composition including (i) the half ester of an organic polyol, (ii) an anhydride, (iii) an epoxide, and (iv) a catalyst; and a thermoset product made from such thermosettable composition. The thermosettable compositions of the present invention are useful in various applications such as casting, potting, and encapsulation, such as electrical and electronics applications, and composites. The thermoset products made from the thermosettable compositions of the present invention have improved mechanical performances, especially toughness and mechanical strength, while maintaining high thermal resistance.

12 Claims, No Drawings

THERMOSETTABLE COMPOSITION CONTAINING A HALF ESTER OF A CYCLOALIPHATIC DIOL AND A THERMOSET PRODUCT THEREFROM

This application is a National Stage application under 35 U.S.C. 371 of PCT/CN2009/000422, filed on Apr. 21, 2009 and published as WO 2010/121392 on Oct. 28, 2010. Priority is claimed to the International Application PCT/CN2009/000422 filed on Apr. 21, 2009, the entire contents of which are incorporated herein by reference.

BACKGROUND OF THE INVENTION

1. Field of the Invention

This invention relates to a half ester of an organic polyol made by reacting polyols with anhydrides; to a thermosettable composition including the half ester of an organic polyol, an anhydride, an epoxide, and a catalyst; and to a thermoset product made from such thermosettable composition.

The thermosettable compositions of the present invention are useful in various applications such as casting, potting, and encapsulation, such as electrical and electronics applications, and composites. The thermoset products made from the thermosettable compositions of the present invention have improved mechanical performances, especially toughness and mechanical strength, while maintaining high thermal resistance.

2. Description of Background and Related Art

Some thermosetting resins are known to have good toughness and good mechanical properties, some thermosetting resins are known to have good thermal resistance, and some thermosetting resins are known to have good processability. However, heretofore, a thermosetting resin exhibiting each and every one of the above characteristics to the extent that such thermosetting resin can be prepared in large scale, and used in high performance applications under significant stress and moisture exposure, has not been made.

There is a need for thermosetting resins with improved mechanical properties (e.g. higher toughness and mechanical strength) while maintaining good thermal resistance and good processability of the resin. High toughness and high mechanical strength leads to less cracking and high mechanical integrity, reducing the number of defects and improving the reliability and life time of the end products. High thermal resistance enables high operation temperature. Low formulation viscosity improves processability and enables high filler loading.

Heretofore, those skilled in the art have attempted to improve the properties of thermosetting resins by adding various additives, such as flexibilizers and toughening agents, to the thermosetting resin. However, the use of conventional flexibilizers such as linear polyols in the thermosetting resin only leads to a moderate improvement in toughness; and significantly reduces the thermal stability of the thermoset because of the resulting low (less than 80° C.) glass transition temperature. The use of conventional toughening agents in the thermosetting resin leads to processing issues because of the high viscosity of the resulting formulation, and because of the complexity of the phase-separation process.

For example, the use of conventional toughening agents such as liquid rubbers, core-shell particles and thermoplastic polymers, in thermosetting resins increases the toughness of the thermosetting resin at the cost of adversely affecting some other properties of the thermosetting resin such as glass transition temperature, mechanical properties, viscosity, etc. It is difficult to maintain the glass transition temperature and mechanical strength when liquid rubbers and thermoplastic polymers are employed to improve toughness; and due to the nature of core-shell particles, it is hard to fully disperse these particles into a thermosetting resin such as an epoxy resin without additional treatments.

Still, there are various prior art technologies that have been used in an attempt to improve the mechanical properties (e.g. higher toughness and mechanical strength) of thermosetting compositions. It would desirable, however, to formulate a half-ester with a thermosetting resin, such as an epoxy resin, to produce a low viscosity formulation suitable for casting, potting, encapsulation, and impregnation processes; wherein the final thermoset product resulting from said formulation displays superior mechanical and thermal properties.

U.S. Pat. No. 4,313,859 discloses a polymerizable liquid mixture of (a) a half ester characterized by the following empirical formula: wherein n is a number having an average value of about 1.5 to less than about 4, m is equal to the free valence of R less the average value of n, R is the hydroxyl-free residue of an organic polyol which contained from 2 to 4, inclusive, hydroxyl groups, OH, in formula (I) (b) maleic anhydride, (c) an epoxide containing two or more 1,2-epoxide radicals, (d) an ethylenically unsaturated monomer which forms a liquid homogeneous mixture with the half ester, maleic anhydride and epoxide, and (e) a basic compound.

However, the composition disclosed in U.S. Pat. No. 4,313,859 contains an ethylenically unsaturated monomer; and does not contain a "saturated" "cyclic" anhydride. "Cyclic" anhydrides contain an anhydride functionality within a ring. "Saturated" anhydrides contain no ethylenic unsaturation but may contain aromatic ring, optionally substituted or partially substituted, and/or optionally hydrogenated or partially hydrogenated such as phthalic anhydride and derivatives. "Unsaturated" anhydrides, on the other hand, contain ethylenic unsaturation that becomes incorporated into the backbone of the ester chain after reaction. Maleic anhydride is an example of an unsaturated anhydride. U.S. Pat. No. 4,313,859 describes the manufacture of a vinyl ester resin which is a different process than a process that uses a cycloaliphatic diol such as 1,3-cyclohexane dimethanol and 1,4-cyclohexane dimethanol which are not described in U.S. Pat. No. 4,313,859.

U.S. Pat. No. 4,497,945 discloses that a tough epoxy polymer is formed by pre-reacting a poly (oxypropylene) diol or triol with a chemical excess of an anhydride curing agent for epoxy resins. The resulting diester-diacid disclosed in U.S. Pat. No. 4,497,945 is then polymerized with an epichlorohydrin-bisphenol A epoxy resin. U.S. Pat. No. 4,497,945 discloses the use of imidizole catalysts for the reactions.

Pre-reacting a poly (oxypropylene) diol or triol having a molecular weight (MW) of about 1000 to about 3000 is different from using a lower molecular weight resin (for example, MW<1000, Dow UNOXOL Diol™ has an average molecular weight of about 144) as disclosed in U.S. Pat. No. 4,497,945. U.S. Pat. No. 4,497,945 also does not disclose the use of a lower MW alcohol or the use of an injection molding (IM) process.

WO 9731965 discloses a process for making high-performance polyetherester resins and thermosets. WO 9731965 discloses that a polyether polyol reacts with a dicarboxylic acid or anhydride in the presence of an insertion catalyst to produce an acid-terminated polyetherester resin. This resin reacts with a primary diol or a diepoxy compound to give a chain-extended polyether ester resin that can be cured with a vinyl monomer to produce a high-performance polyether ester thermoset. Properties of the resulting thermosets rival or exceed those of the more expensive high-performance iso and vinyl ester resins.

The polyether polyol disclosed in WO 9731965 has an average hydroxyl functionality of about 2 to about 8, and a number average molecular weight of about 250 to about 25 000, preferably of about 1000 to 4000, which differs from polyether polyols that have an average molecular weight <1000, preferably <250. The prior art polyol is specifically a polyether polyol. The polyetherester resins are further advanced with a primary diol or an epoxy resin in order to reduce the acid number. The resulting resins are cured (crosslinked) with a vinyl monomer in the presence of a radical initiator. The technology disclosed in WO 9731965 differs from the use of a half-ester to react with an epoxy resin to form the thermoset. WO 9731965 discloses the use of a chain extender such as 1,4-cyclohexane-dimethanol, which is very easy to become solid (crystallization) during processing. WO 9731965 does not disclose the use of a mixture of 1,3-cyclohexane dimethanol and 1,4-cyclohexane dimethanol which is very stable and is a liquid at ambient temperature. This is very important to maintain acceptable processability of the final formulation.

U.S. Patent Application Publication No. 1994274949A discloses a process for the preparation of a linear tertiary aliphatic carboxyl functional polyester resin by reacting a) at least one compound A' comprising one monofunctional primary- or secondary hydroxyl group and/or at least one compound A" comprising one primary- or secondary hydroxyl group and one tertiary aliphatic carboxyl group and b) at least one aromatic or cycloaliphatic dicarboxylic acid compound B comprising two aromatic- or secondary aliphatic carboxyl groups or the anhydride thereof and c) at least one diol compound C comprising two aliphatic hydroxyl groups which may each independently be a primary or a secondary hydroxyl group and d) at least one dihydroxymonocarboxylic acid compound D comprising a tertiary aliphatic carboxyl group and two aliphatic hydroxyl groups, which may each independently be primary or secondary hydroxyl, the molar ratio of compounds A':A":B:C:D being M:N:X+Y+1:X:Y, wherein M+N=2, X ranges from 2 to 8 and Y ranges from 2-N to 8, at a temperature of from 100° C. to 240° C., until essentially all the nontertiary carboxyl groups as initially present in the reaction mixture have been reacted.

The starting materials and process used to make the acid functional polyester as disclosed in U.S. Patent Application Publication No. 1994274949A is a completely different chemistry than using a half ester. U.S. Patent Application Publication No. 1994274949A teaches using a monofunctional primary or secondary hydroxyl group.

U.S. Patent Application Publication No. 1995516144A discloses a method for producing esters of hydroxyl terminated polybutadiene, including the steps of: (a) providing an anhydride; (b) reacting a hydroxyl terminated polybutadiene with the anhydride to form a carboxyl terminated polybutadiene derivative; (c) reacting the derivative with an epoxide. Also a curable composition, including: (a) an ester of hydroxy terminated polybutadiene; (b) a copolymerizable ethylenically unsaturated monomer; and (c) a drier. The chemistry related to an ester of a hydroxyl terminated polybutadiene differs from a reaction product comprising a carboxyl terminated polyether ester.

U.S. Patent Application Publication No. 1995391329A discloses a curable suspensions of an epoxy resin formulation comprising a) a storage-stable suspension of an epoxy resin and a toughener suspended therein which contains no groups that react with a curable epoxy resin system, b) dicyandiamide, a polycarboxylic acid, a polycarboxylic anhydride, a polyamine, a polyaminoamide, an amino group-containing adduct of an amine and a polyepoxide, a polyol or a catalytically curing hardener, and, as optional components, c) a curing catalyst, conventional fillers or reinforcing materials, are particularly suitable for use as casting resins, laminating resins or adhesives.

The starting materials used in U.S. Patent Application Publication No. 1995391329A are blended together without any reaction between them. U.S. Patent Application Publication No. 1995391329A does not disclose an anhydride which is pre-reacted with polyols. In U.S. Patent Application Publication No. 1995391329A, a core/shell polymer toughener is incorporated into the system to improve the toughness.

Most conventional toughening agents, such as rubbers, core-shell particles, thermoplastic block polymers, have a high molecular weight to initiate suitable toughening mechanisms. The high molecular weight, however, has an undesirable effect on the viscosity of the uncured thermoset formulation. Because of the high viscosity, these formulations cannot be used to prepare compositions that need to diffuse into small cavities, and they also cannot be used with conventional processes (e.g., because of limitations of the pumps). To lower the viscosity of these conventional formulations, the processing temperature of the formulation is increased, but this also leads to shortened pot life.

It would be desirable to provide a formulation that uses polyols such as cycloaliphatic polyols that affords improved properties. Accordingly, there is a need to develop a curable composition comprising a half ester of an organic polyol; wherein such the half-resins have a low molecular weight and/or a low viscosity cycloaliphatic polyol and anhydride, which impart greater processability, maintain excellent toughening properties without a dramatic reduction of thermal stability.

Prior art technology use polyether polyols in formulations which do not afford good mechanical properties while maintaining thermal resistance. Accordingly, there is a need in the industry for a curable polyol modified composition having an increase in tensile strength, flexural strength, and especially the impact strength while without significantly decreasing glass transition temperature compared with known polyol modified compositions.

SUMMARY OF THE INVENTION

The present invention provides significant, and in some instances surprising, improvements to thermoset products over conventional thermoset networks due to the unprecedented ability to combine thermal resistance and mechanical performance.

One aspect of the present invention is directed to a curing agent composition comprising the reaction product of: (a) at least one acid cyclic anhydride, (b) at least one low molecular weight cycloaliphatic polyol, and (c) at least one catalyst to promote the reaction between component (a) and component (b).

Another aspect of the present invention is directed to a thermosettable composition comprising the reaction product of: (I) the reaction product of the curing agent composition above with (II) at least one epoxy resin.

Still another aspect of the present invention is directed to a thermoset product comprising a product obtained from polymerizing the thermosettable composition above.

Yet another aspect of the present invention is directed to a thermosettable composition comprising (i) at least one half ester of a cycloaliphatic diol, (ii) at least one anhydride, (iii) at least one epoxide, and (iv) at least one catalyst.

An objective of the present invention is to improve the mechanical performance, especially toughness and mechanical strength, of compositions, such as epoxy/anhydride thermosetting compositions, while maintaining low processing viscosity and high thermal resistance.

Another objective of the present invention is to improve compositions used in casting, potting, and encapsulation, such as electrical and electronics applications, and composites. It is possible to formulate the half-esters of the present invention with epoxy resins to produce low viscosity formulations which are very suitable for casting, potting, encapsulation, and impregnation processes. The final thermoset of the present invention displays superior mechanical and thermal properties.

DETAILED DESCRIPTION OF THE INVENTION

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the present invention is not limited to the specific embodiments described below, but rather; the invention includes all alternatives, modifications, and equivalents falling within the true scope of the appended claims.

Unless other wise stated, a reference to a compound or a component includes the compound or component by itself, as well as in combination with other compounds or components, such as mixtures or combinations of compounds.

As used herein, the singular forms "a," "an," and "the" include the plural reference unless the context clearly dictates otherwise.

In one broad aspect of the present invention, a curing agent is prepared, wherein the curing agent is the reaction product of: (a) at least an acid anhydride with (b) at least a low molecular weight cycloaliphatic polyol and (c) at least a catalyst to promote the reaction between (a) and (b).

In one embodiment of the present invention, acid anhydrides may be modified, for example, with a cycloaliphatic polyol, such as the mixture of 1,3- and 1,4-cyclohexane dimethanol, and a suitable catalyst which leads to half-esters with improve properties.

The acid anhydride component (a) of the present invention used to make the curing agent composition of the present invention may include, for example, phthalic acid anhydride and derivatives; nadic acid anhydride and derivatives; trimellitic acid anhydride and derivatives; pyromellitic acid anhydride and derivatives; benzophenonetetracarboxylic acid anhydride and derivatives; dodecenylsuccinic acid anhydride and derivatives; poly(ethyloctadecanedioic acid) anhydride and derivatives; combinations thereof; and the like. A single acid anhydride component may be used alone or in an admixture of two or more acid anhydride components.

Preferably the acid anhydride, component (a), may be a "saturated" "cyclic" anhydride or a mixture of "saturated" "cyclic" anhydrides. "Cyclic" anhydrides contain the anhydride functionality within a ring. "Saturated" anhydrides contain no ethylenic unsaturation but may contain aromatic ring, optionally substituted or partially substituted, and/or optionally hydrogenated or partially hydrogenated. Preferred examples include phthalic anhydride and derivatives. "Unsaturated" anhydrides contain ethylenic unsaturation that becomes incorporated into the backbone of the ester chain after reaction. Maleic anhydride is an example.

For example, the half ester of the present invention may be made using an anhydride, such as hexahydrophthalic anhydride (HHPA), methyl hexahydrophthalic anhydride (MHHPA), tetrahydrophthalic anhydride, methyltetrahydrophthalic anhydride (MTHPA), methyl-(endo)-5-norbornene-2,3-dicarboxylic anhydride (METHPA), nadic acid anhydride, methyl nadic acid anhydride, or combinations thereof.

The formation of an half ester includes using an excess of cyclic acid anhydride to react with a cycloaliphatic diol, for example, cyclohexane dimethanol or a mixture of 1,3-cyclohexane dimethanol and 1,4-cyclohexane. The half ester produced by the process of the present invention can then be used as curing agent to react with a thermosetting resin such as an epoxy resin in the presence of a catalyst.

In general, the polyol, component (b), useful in the present invention may be any of the well known polyols known in the art. Preferably, the polyol may be an aliphatic polyol. The aliphatic polyol may contain from 2 to about 20 carbon atoms. In one embodiment, the aliphatic polyol may be selected from the groups of linear aliphatic polyols and branched aliphatic polyols. Preferably the polyol does not contain a polyether polyol.

In a preferred embodiment, the polyol may be a cycloaliphatic polyol, and more preferably, the cycloaliphatic polyol may contain from 6 to about 20 carbon atoms. The cycloaliphatic polyol may include for example 1,3-cyclohexanedimethanol, 1,4-cyclohexanedimethanol or mixtures thereof; wherein the weight percent of 1,4-cyclohexanedimethanol may be from 0 weight percent to about 100 weight percent.

As an illustration of one embodiment of the present invention, the polyol component (b) useful in the present invention may be a compound of the following Formula (I):

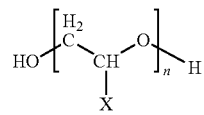

Formula (I)

where X is hydrogen, a branched or linear alkyl group of from 1 to about 10 carbon atoms or an alkyl group of from 1 to about 10 carbon atoms substituted by hydroxyl groups, and n is an integer number from 1 to about 200.

The molecular weight of the polyol, component (b), is generally a low molecular weight, i.e., the polyol has an average molecular weight of above 60 and below 1000, preferably between 80 and 500, more preferably between 100 and 250. Preferably the low molecular weight polyol is a cycloaliphatic polyol. The low molecular polyol (b) has an average hydroxyl equivalent weight between 20 and 1000, preferably between 30 and 500, more preferably between 40 and 250, even more preferably between 50 and 120. For example, the half ester of the present invention may be made using a mixture of 1,3-cyclohexane dimethanol and 1,4-cyclohexane dimethanol; or other cycloaliphatic polyols with a molecule weight ranging from about 100 to about 1000.

The average hydroxyl functionality of the polyol is strictly higher than 1, preferably higher than 1.5, and more preferably higher than 2. The average hydroxyl functionality of the polyol is lower than 10, preferably lower than 6, and more preferably lower than 4. One embodiment of the average hydroxyl functionality range of the polyol may be from about 1.5 to about 10, preferably from about 2 to about 6, and more preferably from about 2 to about 4.

The concentration of the polyol may be chosen between about 0.1 wt. % to about 40 wt. %, preferably between about 0.2 wt. % to 20 wt. %, more preferably between about 0.3 wt. % to about 15 wt. %, and most preferably between about 0.5 wt. % to about 10 wt. % based on the weight of the total organic compound. If the concentration of the polyol is above about 40%, the glass transition temperature is significantly decreased. If the concentration of the polyol is below about 0.1%, there is no obvious improvement in mechanical properties, combined with a loss in toughness.

The weight ratio of the acid anhydride (a) to the polyol (b) is chosen between 50:1 to 1:50, preferably between 20:1 to 1:40, more preferably between 15:1 to 1:30, and most preferably between 10:1 to 1:20. Above and below these ranges, the synergy observed between the polyol and the acid anhydride is no longer visible and the properties are similar to the ones obtained with a single component.

In general, the catalyst, component (c), useful in the present invention for preparing the half ester curing agent composition, may be any of the well known catalysts known in the art. The catalyst is used to accelerate the speed of the reaction of polyols with anhydrides.

For example, the catalyst may include Lewis acids; protic acids; metal salts of the protic acids; quaternary phosphonium compounds and quaternary ammonium compounds; or quaternary and tertiary ammonium, phosphonium, and arsonium adducts or complexes with suitable non-nucleophilic acids such as, for example, fluoboric, fluoarsenic, fluoantimonic, fluophosphoric, perchloric, perbromic, periodic; and combinations thereof.

Embodiments of phosphonium compounds useful as the catalyst, component (c), in the present invention include, for example, ethyltriphenylphosphonium; ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.acetic acid complex), ethyltriphenylphosphonium tetrahaloborate, tetrabutylphosphonium chloride, tetrabutylphosphonium acetate, tetrabutylphosphonium diacetate (tetrabutylphosphonium acetate.acetic acid complex), tetrabutylphosphonium tetrahaloborate, butyltriphenylphosphonium tetrabromobisphenate, butyltriphenylphosphonium bisphenate, butyltriphenylphosphonium bicarbonate, and mixtures thereof.

Embodiments of ammonium compounds useful as the catalyst, component (c), in the present invention include, for example, benzyltrimethylammonium chloride, benzyltrimethylammonium hydroxide, benzyltrimethylammonium tetrahaloborate, tetramethylammonium hydroxide, tetrabutylammonium hydroxide, tetrabutylammonium tetrahaloborate, triethylammonium chloride, triethylammonium bromide, triethylammonium iodide, triethylammonium tetrahaloborate, tributylammonium chloride, tributylammonium bromide, tributylammonium iodide, tributylammonium tetrahaloborate, N,N'-dimethyl-1,2-diaminoethane.tetrahaloboric acid complex, and mixtures thereof.

In addition, examples of other suitable catalyst, component (c), useful for the reaction between components (a) and (b) of the present invention may include compounds containing amine, phosphine, heterocyclic nitrogen, and any combination thereof. The catalyst may include for example heterocyclic nitrogen-containing compounds and amine-containing compounds. The amine and phosphine moieties in catalysts may be tertiary amine and phosphine moieties. Among the tertiary amines that may be used as catalysts are those mono- or polyamines having an open-chain or cyclic structure which have all of the amine hydrogen replaced by suitable substituents, such as hydrocarbyl radicals, and preferably aliphatic, cycloaliphatic or aromatic radicals. Examples of suitable heterocyclic nitrogen-containing catalysts useful in the present invention include those described in U.S. Pat. No. 4,925,901; incorporated herein by reference.

Heterocyclic secondary and tertiary amines or nitrogen-containing catalysts which can be employed herein include, for example, imidazoles, benzimidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, and any combination thereof. Especially preferred are the alkyl-substituted imidazoles; 2,5-chloro-4-ethyl imidazole; and phenyl-substituted imidazoles, and any mixture thereof. Examples of preferred embodiments of the catalysts useful in the present invention include N-methylimidazole; 2-methylimidazole; 2-ethyl-4-methylimidazole; 1,2-dimethylimidazole; 2-methylimidazole; imidazole-epoxy reaction adducts and mixtures thereof. More preferred embodiments of the catalysts include for example 2-phenylimidazole, 2-methylimidazole; 2-methylimidazole-epoxy adducts; and mixtures thereof.

Embodiments of other catalysts suitable for the present invention include tertiary amines such as, for example, triethylamine, tripropylamine, tributylamine, 2-methylimidazole, benzyldimethylamine, 2-phenyl imidazole, 1-benzyl-2-phenyl imidazole (1B2PZ), imidazole derivative, 1,8-Diazabicyclo[5.4.0]undec-7-ene (DBU), 2-methyl imidazole—epoxy adduct, such as EPON™ P101 (available from Hexion Chemical), isocyanate—amine adduct (available from Degussa); and any combination thereof.

The concentration of the catalyst (c) present in the curing agent composition ranges generally from about 0.001 wt % to about 10 wt %, based on the total weight of the acid anhydride composition; preferably from about 0.01 wt % to about 5 wt %, and more preferably from about 0.1 wt % to about 2 wt %. Above the about 10 wt % range, the reaction may be too fast leading possibly to poor processability; and thus, the formulation may not be processed under conventional processing conditions. Below the about 0.001 wt % range, the reaction may be too slow prolonging the reaction time; and thus, the formulation may not be processed under conventional processing conditions.

The half-ester curing agent composition of the present invention may be prepared by mixing the above components (a)-(c) in any order and allowing the components (reactants) to react at a temperature of from about 25° C. to about 150° C.; and preferably at a temperature of from about 60° C. to about 120° C.; and more preferably at a temperature of from about 90° C. to 110° C.

One beneficial property of curing agent product resulting from the reaction of: (a) at least one acid cyclic anhydride, (b) at least one low molecular weight cycloaliphatic polyol, and (c) at least one catalyst, is that the curing agent product has a low viscosity, i.e., the viscosity of the curing agent is generally less than about 10000 mPa·s, generally from about 50 mPa·s to about 1500 mPa·s, preferably from about 100 mPa·s to about 750 mPa·s, and more preferably, from about 200 mPa·s to about 375 mPa·s.

The curing composition of the present invention may optionally contain one or more other additives which are useful for their intended uses. For example, the optional additives useful in the present invention curing agent composition may include, but not limited to, stabilizers, surfactants, flow modifiers, pigments or dyes, matting agents, degassing agents, flame retardants, toughening agents, curing initiators, curing inhibitors, wetting agents, colorants or pigments, thermoplastics, processing aids, UV blocking compounds, fluorescent compounds, UV stabilizers, inert fillers, antioxidants, impact modifiers including thermoplastic particles, and mixtures thereof. The above list is intended to be exemplary and not limiting. The preferred additives for the, formulation of the present invention may be optimized by the skilled artisan.

The concentration of the additional additives is generally between about 0 wt % to about 50 wt %, preferably between about 0.01 wt % to about 20 wt %, more preferably between about 0.05 wt % to about 15 wt %, and most preferably between about 0.1 wt % to about 10 wt % based on the weight of the total composition. Below about 0.01 wt %, the additives generally do not provide any further significant advantage to the resultant curing composition; and above about 20 wt %, the properties improvement brought by these additives remains relatively constant.

Another broad aspect of the present invention includes a thermosettable composition including (i) a half ester of a cycloaliphatic diol, (ii) an anhydride, (iii) a thermosetting resin such as an epoxide, and (iv) a catalyst.

The half ester of a cycloaliphatic diol, component (i), used in the thermosettable composition of present invention is the curing agent product prepared by reacting Components (a)-(c) as described above.

The anhydride, component (ii), used in the thermosettable composition of present invention may include any of the anhydrides well known in the art and any of the anhydrides used to make the half ester curing agent as described above.

Component (iii) useful in the thermosettable composition of the present invention may be selected from known thermosetting resins in the art including at least one resin selected from epoxy resins; isocyanate resins; (meth)acrylic resins; phenolic resins; vinylic resins; styrenic resins; polyester resins; melamine resins; vinylester resins; silicone resins; and mixtures thereof.

In one preferred embodiment, the thermosetting resin useful in the present invention includes at least one epoxy resin, component (iii). The term "epoxy resin" herein means a compound which possesses one or more vicinal epoxy groups per molecule, i.e., at least one 1,2-epoxy group per molecule. In general, the epoxy resin compound may be a saturated or unsaturated aliphatic, cycloaliphatic, aromatic or heterocyclic compound which possesses at least one 1,2-epoxy group. Such compounds can be substituted, if desired, with one or more non-interfering substituents, such as halogen atoms, hydroxy groups, ether radicals, lower alkyls and the like. The epoxy resin compound may also be monomeric, oligomeric or polymeric, i.e., the epoxy resin may be selected from a monoepoxide, a diepoxide, a multi-functional epoxy resin, a polyepoxide; or mixtures thereof. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The epoxy resins useful in the present invention, may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more of any of the above epoxy resins.

The epoxy resins, component (iii), useful in the present invention for the preparation of the curable compositions, may be selected from commercially available products. For example, D.E.R. 331, D.E.R. 332, D.E.R. 334, D.E.R. 580, D.E.N. 431, D.E.N. 438, D.E.R. 736, or D.E.R. 732 available from The Dow Chemical Company may be used. As an illustration of the present invention, the epoxy resin component (a) may be a liquid epoxy resin, D.E.R.® 383 (DGEBPA) having an epoxide equivalent weight of 175-185, a viscosity of 9.5 Pa-s and a density of 1.16 gms/cc. Other commercial epoxy resins that can be used for the epoxy resin component can be D.E.R. 330, D.E.R. 354, or D.E.R. 332.

Other suitable epoxy resins useful as component (a) are disclosed in, for example, U.S. Pat. Nos. 3,018,262, 7,163,973, 6,887,574, 6,632,893, 6,242,083, 7,037,958, 6,572,971, 6,153,719, and 5,405,688, PCT Publication WO 2006/052727; U.S. Patent Application Publication Nos. 20060293172 and 20050171237, each of which is hereby incorporated herein by reference.

The thermosetting resin, component (iii), may be present in the thermosetting composition at a concentration ranging generally from about 10 weight percent (wt %) to about 95 wt %, preferably from about 20 wt % to about 90 wt %, and more preferably from about 30 wt % to about 80 wt %.

The thermosettable composition of the present invention may contain a catalyst or an accelerator for the reaction between the thermosetting resin such as the epoxy resin and curing agent. The catalyst useful in the present invention may include any of the aforementioned catalysts above.

Also, suitable accelerators include, for example, 2-methyl imidazole, 2-ethyl-4-methylimidazole, 2-isopropylimidazole, 1-propylimidazole, 2-heptadecylimidazole, benzyldimethylamine, ethyltriphenylphosphonium acetate, ethyltriphenylphosphonium chloride, ethyltriphenylphosphonium bromide, ethyltriphenylphosphonium iodide, ethyltriphenylphosphonium diacetate (ethyltriphenylphosphonium acetate.acetic acid complex), ethyltriphenylphosphonium tetrahaloborate, tetrabutylphosphonium chloride, tetrabutylphosphonium acetate, tetrabutylphosphonium diacetate (tetrabutylphosphonium acetate.acetic acid complex), tetrabutylphosphonium tetrahaloborate, butyltriphenylphosphonium tetrabromobisphenate, butyltriphenylphosphonium bisphenate, butyltriphenylphosphonium bicarbonate, benzyltrimethylammonium chloride, benzyltrimethylammonium hydroxide, benzyltrimethylammonium tetrahaloborate, tetramethylammonium hydroxide, tetrabutylammonium hydroxide, tetrabutylammonium tetrahaloborate, triethylamine, tripropylamine, tributylamine, 2-methylimidazole, benzyldimethylamine, triethylammonium chloride, triethylammonium bromide, triethylammonium iodide, triethylammonium tetrahaloborate, tributylammonium chloride, tributylammonium bromide, tributylammonium iodide, tributylammonium tetrahaloborate, N,N'-dimethyl-1,2-diaminoethane.tetrahaloboric acid complex, mixtures thereof.

The thermosettable composition of the present invention may optionally contain one or more other additives which are useful for their intended uses. For example, the optional additives useful in the present invention thermosettable composition may include, but not limited to, stabilizers, surfactants, flow modifiers, pigments or dyes, matting agents, degassing agents, flame retardants, toughening agents, polyols and glycols, curing initiators, curing inhibitors, wetting agents, colorants or pigments, thermoplastics, processing aids, UV blocking compounds, fluorescent compounds, UV stabilizers, inert fillers, antioxidants, impact modifiers including thermoplastic particles, and mixtures thereof. The above list is intended to be exemplary and not limiting. The preferred additives for the, formulation of the present invention may be optimized by the skilled artisan.

The concentration of the additional additives is generally between about 0 wt % to about 50 wt %, preferably between about 0.01 wt % to about 20 wt %, more preferably between about 0.05 wt % to about 15 wt %, and most preferably between about 0.1 wt % to about 10 wt % based on the weight of the total composition. Below about 0.01 wt %, the additives generally do not provide any further significant advantage to the resultant curing composition; and above about 20 wt %, the properties improvement brought by these additives remains relatively constant.

The thermosettable resin composition of the present invention may optionally further comprise at least a second curing agent or co-curing agent. The co-curing agent, (also referred to as a co-hardener or co-cross-linking agent) may be selected, for example, from those curing agents well known in the art including, but are not limited to anhydrides, amines, phenolic resins, carboxylic acids, and polyol resins. In embodiments wherein the reactive resin comprises an isocyanate, at least one curing agent may be selected from polyols.

As an illustration of one embodiment wherein the thermosetting resin comprises an epoxy resin, at least one co-curing agent may be selected from amines, phenolic resins, carboxylic acids, carboxylic anhydrides, or mixtures thereof.

As an illustration of one embodiment wherein the thermosetting resin comprises an isocyanate, the at least one co-curing agent may be selected from at least one polyol.

Examples of the co-curing agent useful in the present invention include any of the curing materials known to be useful for curing epoxy resin based compositions. Such materials include, for example, polyamine, polyamide, polyaminoamide, dicyandiamide, polyphenol, polymeric thiol, polycarboxylic acid and anhydride, polyol, tertiary amine, quaternary ammonium halide, and any combination thereof or the like. Other specific examples of the co-curing agent include dicyandiamide, phenol novolacs, bisphenol-A novolacs, phenol novolac of dicyclopentadiene, diphenylsulfone, styrene-maleic acid anhydride (SMA) copolymers; and any combination thereof.

Dicyandiamide ("dicy") maybe one preferred embodiment of the co-curing agent useful in the present invention. Dicy has the advantage of providing delayed curing since dicy requires relatively high temperatures for activating its curing properties; and thus, dicy can be added to an epoxy resin and stored at room temperature (about 25° C.).

The co-curing agent may be present in the thermosettable composition at a concentration ranging generally from about 0 wt % to about 90 wt %, preferably from about 1 wt % to about 80 wt %, more preferably from about 5 wt % to about 60 wt %, and most preferably from about 10 wt % to about 50 wt %.

For example, the thermosettable composition may further optionally include one or more fillers or fibrous reinforcements. Optionally the thermosettable composition of the present invention may contain at least one filler, such as an inorganic filler. For example, when the thermosettable composition contains an inorganic filler, the inorganic filler can be selected among any organic filler, preferably among silica, talc, quartz, mica, and flame retardant fillers such as aluminum trihydroxide, magnesium hydroxide, boehmite, and combinations thereof.

The concentration of the optional inorganic filler may be generally from about 0 wt % to about 95 wt %, preferably from about 1% to about 95%, more preferably between about 2% and about 90%, more preferably between about 5% and about 85%, even more preferably between about 10% and about 80%, and even more preferably between about 15% and about 75%, based on the total weight of the composition.

Preferably at least one average dimension of the inorganic filler particles is below about 1 mm, preferably below about 100 micron, more preferably below about 50 micron, and even more preferably below about 10 micron, and above about 2 nm, preferably above about 10 nm, more preferably above about 20 nm, and even more preferably above about 50 nm.

The thermosetting composition may further include a second thermosetting resin different from the first thermosetting resin and different from the co-curing agent. For example, the composition may include a combination of a first reactive thermosetting resin and a second reactive thermosetting resin. The second reactive resin useful in the present invention may form a part of the cross-linked network. For example, the second thermosetting resin may be selected from known thermosetting resins in the art including at least one resin selected from epoxy resins; isocyanate resins; (meth)acrylic resins; phenolic resins; vinylic resins; styrenic resins; polyester resins; melamine resins; vinylester resins; silicone resins; and mixtures thereof.

The concentration of the additional reactive thermosetting resin is generally between about 0.5% by weight to about 50% by weight, preferably between about 1% to about 40%, more preferably between about 2% to about 30%, and most preferably between about 5% to about 25% based on the weight of the total organic compounds. Above 50%, the additional reactive resin becomes the main resin. Below 0.5%, the concentration is not large enough to make a difference in properties.

The thermosettable composition of the present invention may optionally further comprise at least one solvent. The solvents useful in the present invention may include for example ketones, alcohols, water, glycol ethers, aromatic hydrocarbons and mixtures thereof. The solvent may include, for example, acetone, methyl ethyl ketone, methyl isobutyl ketone, cyclohexanone, methylpyrrolidinone, propylene glycol monomethyl ether, propylene glycol monomethyl ether acetate, ethylene glycol monomethyl ether, methyl amyl ketone, methanol, isopropanol, toluene, xylene, dimethylformamide (DMF) and mixtures thereof. A single solvent may be used, but also separate solvents may be used for one or more components. Suitable solvents for the epoxy resins and curing agents may be ketones, including acetone, methylethyl ketone and the like, and ether alcohols such as methyl, ethyl, propyl or butyl ethers of ethylene glycol, diethylene glycol, propylene glycol or dipropylene glycol, ethylene glycol monomethyl ether, or 1-methoxy-2-propanol, and the respective acetates. Embodiments of the solvent for the catalyst of the present invention include alcohols, ketones, water, dimethylformamide (DMF), glycol ethers such as propylene glycol monomethyl ether or ethylene glycol monomethyl ether, and combinations thereof.

The concentration of the solvent is generally between about 0% to about 80%, preferably between about 1% to about 60%, more preferably between about 2% to about 50%, and most preferably between about 5% to about 40% based on the weight of the total organic compounds.

The thermosettable composition of the present invention may optionally comprise an inhibitor additive such as a Lewis acid. Examples of the Lewis acids useful for the present invention include halides, oxides, hydroxides, and alkoxides of zinc, tin, titanium, cobalt, manganese, iron, silicon, aluminum, boron, other Lewis acids that tend to have a relatively weak conjugate base such as boric acid, and any mixture thereof. More specific examples include Lewis acids of boron and anhydrides of Lewis acids of boron. Preferred examples of Lewis acids of boron include boric acid, metaboric acid, substituted boroxines (such as trimethoxyboroxine, triethyl boroxine), substituted oxides of boron, alkyl borates, and any mixture thereof.

The Lewis acid may form a mixture with the amine catalyst including any amine-containing compound stated above. The Lewis acid and amines catalyst mixture can be combined before mixing into the thermosettable composition or mixed with the amines catalyst in-situ to make a curing catalyst combination.

The final thermosettable formulation can be cured under conventional processing conditions to form a thermoset. In general, the curing reaction may be conducted between about 25° C. and about 180° C., preferably between about 50° C. and about 150° C., more preferably between about 80° C. and about 120° C. Preferably the reaction time is more than about 10 minutes and less than about 48 hours, preferably between about 30 min and about 24 hours, and more preferably between about 1 hours and about 6 hours.

The concentration of the reaction product (I) in the thermosettable formulation is between about 10 wt % and about 90 wt %, preferably between about 20 wt % and about 80 wt %, more preferably between about 30 wt % and about 70 wt %, based on the total weight of the components, excluding optional filler.

As an illustration of one embodiment of the present invention, the following reactants may be used: 5 wt. %~30 wt. % polyols, 70 wt %~95 wt % anhydrides, and 0.5 wt. %~1.0 wt. % ethyltriphenylphosphonium acid acetate solution. For example, reaction product (1) is made from 8.16 wt. % UNOXOL Diol™, 91.34 wt. % MTHPA and 0.5% A-1 (70 wt. % ethyltriphenylphosphonium acid acetate solution) catalyst by heating up the reactor at 110° C. for 3 hours.

The targeted polyol conversion in the reaction product (I) is preferably higher than about 80%, preferably about 100%. Preferably the reaction product (I) is such that the polyol conversion is higher than about 10%, preferably higher than about 20%, more preferably higher than about 50%, and even more preferably higher than about 80%.

The molar ratio of polyol to anhydride is such that the reaction product (I) contains carboxylic moieties. The molar ratio of anhydride groups to hydroxyl groups is larger than about 1, i.e., an excess of anhydride. Preferably the molar ratio of anhydride groups to hydroxyl groups is larger than about 2, more preferably larger than about 4, and most preferably larger than about 8.

The targeted anhydride conversion in the reaction product (I) is preferably about 80% by mole ratio, more preferably is about 60%, even more preferably is about 40%, and most preferably is about 20%.

The preferred viscosity range of (I) is about 100 cP to about 2000 cP, more preferably range is about 100 cP to about 1000 cP, even more preferably range is about 100 cP to about 500 cP, and most preferably range is about 100 cP to about 300 cP.

The resulting thermoset displays excellent thermo-mechanical properties, such as good toughness and mechanical strength, while maintaining high thermal stability. The present invention formulations achieve an excellent balance of all these properties without sacrificing thermal resistance or mechanical properties.

For example, the cured thermoset product preferably shows a glass transition temperature higher than about 70° C., preferably higher than about 90° C., more preferably higher than about 110° C. The cured thermoset product preferably shows a toughness measured by KIc value higher than about 0.6 MPa·m$^{1/2}$, preferably higher than about 0.8 MPa·m$^{1/2}$, more preferably higher than about 1.0 MPa·m$^{1/2}$, and even more preferably higher than about 1.2 MPa·m$^{1/2}$.

As an illustration of the present invention, in general, the compositions of the present invention may be useful for casting, potting, encapsulation, molding, and tooling. The present invention is particularly suitable for all types of electrical casting, potting, and encapsulation applications; for molding and plastic tooling; and for the fabrication of epoxy based composites parts, particularly for producing large epoxy-based parts produced by casting, potting and encapsulation. The resulting composite material exhibiting anisotropic property may be useful in some applications, such as electrical casting applications or electronic encapsulations, castings, moldings, potting, encapsulations, injection, resin transfer moldings, composites, coatings, that require an outstanding performance along a certain direction.

The present invention compositions are advantageously used in casting, potting, and encapsulation, such as electrical and electronics applications. The present invention can be also useful in any applications requiring high toughness. Examples for such applications could be composites, laminates or reactive coating applications.

EXAMPLES

The following examples and comparative examples further illustrate the present invention in detail but are not to be construed to limit the scope thereof.

Various terms, designations and raw materials are used in the following examples are explained herein below:

| Component | Chemical Structure of Component |
|---|---|
| Diglycidyl ether of Bisphenol A | |

-continued

| Component | Chemical Structure of Component |
|---|---|
| Methyltetrahydrophthalic anhydride (MTHPA) | (structure of methyltetrahydrophthalic anhydride) |
| Mixture of 1,3-cyclohexanedimethanol (CHDM) and 1,4-cyclohexanedimethanol (CHDM) | (cis,trans)-1,4-Cyclohexane dimethanol + (cis,trans)-1,3-Cyclohexane dimethanol |
| Polypropylene glycol 400 and 2000 | (structure of polypropylene glycol) |

Example 1 and Comparative Examples A and B

Pre-reaction products were formulated according to the components listed in Table I below. The process of formulating the compositions of Examples 1 and Comparative Examples A and B was as follows:

Example 1 was made by first mixing methyltetrahydrophthalic anhydride (MTHPA) with a mixture of 1,3-CHDM and 1,4-CHDM (step #1). Then ethyltriphenylphosphonium acid acetate was added into the mixture when the temperature of the mixture was above 90° C. (step #2). The temperature of the resultant mixture was kept at a temperature of about 110° C. for about 3-4 hours (step #3).

Comparative Example A and Comparative Example B were made following the same procedure for making the composition of Example 1.

Comparative Example A is an example of a conventional formulation to prepare flexibilized modified anhydride. Comparative example B is another example of a conventional formulation by using higher Mw polypropylene glycol with the same weight loading in the half ester.

TABLE I

| | Compositions | | |
|---|---|---|---|
| Half ester (g) | Example 1 | Comparative Example A | Comparative Example B |
| Methyltetrahydrophthalic anhydride (MTHPA) | 91.34 | 79.6 | 79.6 |
| Mixture of 1,3-CHDM and 1,4-CHDM | 8.16 | | |
| Polypropylene glycol 400 | | 19.9 | |
| Polyethylene glycol 2000 | | | 19.9 |
| ethyltriphenylphosphonium acid acetate | 0.50 | 0.50 | 0.50 |
| Total | 100.0 | 100.0 | 100.0 |
| Mole ratio (MTHPA:Alcohol) | 10:1 | 10:1 | 40:1 |
| Viscosity at 25° C. (cP) | 271 | 470 | n.a. |

Example 2 and Comparative Examples C-E

Example 2 was made by mixing the pre-reaction product of Example 1, diglycidyl ether of bisphenol A epoxy resin, and BYK A530 (defoam agent) thoroughly. Crystalline silica (50% by weight) was dispersed into the resultant mixture using a high speed disperser for about 0.5-1 hour. The final mixture was degassed in a vacuum oven.

Comparative Examples C-E were made using the same procedure as for making Example 2.

The pre-reacted products were further formulated according to the following Table II.

TABLE II

| | Silica content (wt. %) | | | |
|---|---|---|---|---|
| | 50 | 50 | 50 | 50 |
| | | Epoxy/Hardener (molar ratio) | | |
| Formulation | 1:0.95 Example 2 | 1:0.95 Comparative Example C | 1:0.95 Comparative Example D | 1:0.95 Comparative Example E |
| DYD128 (diglycidyl ether of bisphenol A epoxy resin) | 99.01 | 99.01 | 99.01 | 99.01 |
| BYK A530 (Defoamer) | 0.99 | 0.99 | 0.99 | 0.99 |
| MTHPA | | | | 84.4 |
| half ester from Example 1 | 92.4 | | | |
| half ester from Comparative Example A | | 106.0 | | |
| half ester from Comparative Example B | | | 106.0 | |
| Silica Flour | 192.4 | 206.0 | 206.0 | 184.4 |
| Total | 384.8 | 412.0 | 412.0 | 368.0 |

The following standard analytical equipments, methods and test procedures are used in the Examples:

The viscosity of an uncured formulation is measured on a Research Equipment (London) LTD cone and plate viscometer at 25° C. and 50° C., respectively. Viscosity of final formulation is strongly depended by the filler content. The higher filler loading the higher viscosity uncured formulation is. Lower viscosity is required to have better processing property when casting. It changes from several thousands to several ten thousands with 50 wt % silica (as shown in Table II and Table III).

The glass transition temperature (Tg) is measured according to the procedure in ISO 11357-2. In general, the range for glass transition temperature Tg is from about 75° C. to about 123° C. A high Tg of cured formulation is preferred if toughness of cured sample is the same.

Tensile properties are measured according to the procedure in ISO 527. The tensile strength is strongly depended on filler content. Generally the tensile strength varies from about 60 MPa to about 80 MPa when adding 50 wt. % silica flour into the composition matrix. A higher tensile strength is preferred to resist to deformation or forces outside.

Flexure properties are measured according to the procedure in ISO 178. Flexural strength is strongly depended on filler content. Generally, the flexure strength varies from about 100 MPa to about 150 MPa when adding 50 wt. % silica flour into the matrix. A higher flexural strength is preferred.

Impact strength is measured according to the procedure in ASTM D4812. Impact strength is strongly depended on the modification level of the composition when adding polyols. Impact strength is one important parameter to evaluate the toughness of the final product. Usually, the higher the impact strength, the higher the toughness of the cured sample. Generally, the impact strength (50 wt. % silica) varies from about 10 kJ/m$^2$ to about 20 kJ/m$^2$.

The following Table III describes the thermal mechanical properties of the cured products of cycloaliphatic diol modified anhydride with epoxy resin.

TABLE III

Properties of Resins

| Sample name | Viscosity @ 25° C. (mPa·s) | Tg (° C.) | Tensile Strength (MPa) | Flexural Strength (MPa) | Impact strength (kJ/m$^2$, average) |
|---|---|---|---|---|---|
| Example 2 | 11900 | 113 | 75 | 141 | 17 |
| Comparative Example C | 15800 | 75 | 71 | 131 | 16 |
| Comparative Example D | 5000 | 106 | 65 | 120 | 13 |
| Comparative Example E | 3840 | 123 | 72 | 130 | 12 |

* The samples were cured at 2 h @ 120° C. + 2 h @ 160° C.

When compared with Comparative Example C, Example 2 leads to significantly improved thermal resistance as confirmed by the higher Tg, lower viscosity resulting in better processability. Mechanical properties of Example 2 are also better than Comparative Example C, as demonstrated by the higher tensile and flexural strengths and marginally better impact strength.

When compared with Comparative Example D, Example 2 leads to significantly improved mechanical properties, as demonstrated by the higher tensile and flexural strengths and much better impact strength. Thermal resistance improved as confirmed by the higher glass transition temperature.

When compared with Comparative Example E, Example 2 leads to significantly improved mechanical properties, as demonstrated by the higher tensile and flexural strengths and much better impact strength. The glass transition temperature is moderately impacted. Example 2 shows the best balance of processability and thermal mechanical properties when compared with comparative example C and E.

It will be obvious to persons skilled in the art that certain changes may be made in the methods described above without departing from the scope of the present invention. It is therefore intended that all matter herein disclosed be interpreted as illustrative only and not as limiting the scope of protection sought. Moreover, the present invention is not to be limited by the specific examples set forth above including the tables to which they refer. Rather, these examples and the tables they refer to are illustrative of the present invention.

What is claimed is:

1. A curing agent composition comprising a reaction product of (a) at least one saturated cyclic anhydride, (b) a mixture of 1,3-cyclohexanedimethanol and 1,4-cyclohexanedimethanol, and (c) at least one catalyst to promote the reaction between component (a) and component (b).

2. The composition of claim 1, wherein the concentration of the at least one saturated cyclic anhydride comprises from about 20 weight percent to about 95 weight percent.

3. The composition of claim 1, wherein the concentration of the mixture of 1,3-cyclohexanedimethanol and 1,4-cyclohexanedimethanol comprises from about 5 weight percent to about 80 weight percent.

4. The composition of claim 1, wherein the concentration of the at least one catalyst comprises from about 0.5 weight percent to about 5 weight percent.

5. The composition of claim 1, wherein the at least one saturated cyclic anhydride comprises at least one of methyl hexahydrophathalic anhydride (MHHPA); methylhexahydrophthalic anhydride; pyromellitic dianhydride; ciscyclopentanetetracarboxylic acid dianhydride; hemimellitic anhydride; trimellitic anhydride; naphthalene-1,8-dicarboxylic acid anhydride; phthalic anhydride; glutaric anhydride; succinic anhydride; or mixtures thereof.

6. The composition of claim 1, wherein the at least one catalyst comprises at least one of Lewis acids; protic acids; metal salts of protic acids; quaternary phosphonium compounds; quaternary ammonium compounds; acid acetate; quaternary and tertiary ammonium, phosphonium, and arsonium adducts or complexes with suitable non-nucleophilic acids; and mixtures thereof.

7. A curable composition comprising a mixture of (I) the curing agent composition of claim 1; and (II) at least one epoxy resin.

8. The composition of claim 7, wherein the at least one epoxy comprises diglycidyl ether of bisphenol A or derivatives thereof; diglycidyl ether of bisphenol F or derivatives thereof; and mixtures thereof.

9. The composition of claim 7, wherein the at least one epoxy comprises at least one epoxide derived from the epoxidation of a diene or polyene.

10. The composition of claim 7, wherein the at least one epoxy comprises an epoxide selected from one of 3,4-epoxycyclohexylmethyl 3,4-epoxycyclohexane carboxylate; 3,4-epoxy-6-methylcyclohexyl-methyl; 3,4-epoxy-6-methylcyclohexyl-carboxylate; bis(2,3-epoxy-cyclopentyl)ether; epoxidized polybutadiene; epoxidized soybean oil; bis(3,4-epoxy-6-methyl-cyclohexylmethyl)adipate; vinyl cyclohexene dioxide; 2-(3,4-epoxy-cyclohexyl-5,5-spiro-3,4-epoxy) cyclohexane-metadioxane; dipentene dioxide; divinylbenzene dioxide; and mixtures thereof.

11. The composition of claim 7, wherein the concentration of the at least one epoxy comprises from about 20 weight percent to about 80 weight percent.

12. A curable composition comprising (a) a mixture of 1,3-cyclohexanedimethanol and 1,4-cyclohexanedimethanol (b) at least one saturated cyclic anhydride, (c) at least one epoxide, and (d) at least one catalyst.

* * * * *